United States Patent [19]

Hickethier et al.

[11] Patent Number: 4,509,086
[45] Date of Patent: Apr. 2, 1985

[54] METHOD AND APPARATUS FOR LOADING AND REGISTERING A DISKETTE IN A DISKETTE DRIVE

[75] Inventors: Craig R. Hickethier; Ronald E. Hogan, both of Boulder; Marvin E. Prahl, Longmont, all of Colo.

[73] Assignee: International Business Machines Corporation, Armonk, N.Y.

[21] Appl. No.: 391,050

[22] Filed: Jun. 22, 1982

[51] Int. Cl.³ ............................................. G11B 5/016
[52] U.S. Cl. ......................................... 360/99; 360/86
[58] Field of Search .................................. 360/97-99, 360/86, 133, 135

[56] References Cited

U.S. PATENT DOCUMENTS

| | | | |
|---|---|---|---|
| 3,593,327 | 7/1971 | Shill | 360/97 X |
| 3,770,908 | 11/1973 | Craggs | 360/99 |
| 3,800,325 | 3/1974 | O'Brien | 360/98 |
| 3,815,150 | 6/1974 | Stoddard et al. | 360/99 |
| 3,845,502 | 10/1974 | Paus | 360/86 |
| 3,890,643 | 6/1975 | Dalziel | 360/99 |
| 3,899,794 | 8/1975 | Brown, Jr. | 360/86 X |
| 3,947,893 | 3/1976 | Hall, Sr. | 360/99 X |
| 4,193,101 | 3/1980 | Carlson et al. | 360/97 |
| 4,272,795 | 6/1981 | Davis, Jr. et al. | 360/99 |
| 4,339,778 | 7/1982 | Wise | 360/98 X |

FOREIGN PATENT DOCUMENTS 2082371 3/1982 United Kingdom .

*Primary Examiner*—John H. Wolff
*Attorney, Agent, or Firm*—Homer L. Knearl

[57] ABSTRACT

The diskette drive described herein reads and writes information on a flexible magnetic disk stored in a rigid diskette cartridge. The drive contains apparatus for loading and registering the cartridge in the drive without the assistance of a loading tray or cartridge carrier. The disk drive spindle, the recording head and cartridge position registration pins all protrude into the insertion path for the cartridge. The spindle and pins are shaped and positioned so that the cartridge will not strike the recording head as it is inserted. Spring fingers are provided to bias the cartridge down against the spindle and the registration pins. When the cartridge is fully inserted, it snaps into a registered position over the pins, the spindle and the recording head. In addition the cartridge contains a truncated corner that cooperates with a blocking member in the insertion path to prevent the cartridge from being improperly inserted.

14 Claims, 11 Drawing Figures

METHOD AND APPARATUS FOR LOADING AND REGISTERING A DISKETTE IN A DISKETTE DRIVE

FIELD OF THE INVENTION

This invention relates to loading and unloading a rigid diskette cartridge, containing a flexible magnetic disk, into a disk drive. More particularly, the invention relates to loading the diskette cartridge in the drive and registering the diskette cartridge with registration pins having a predetermined position relative to the disk drive spindle.

BACKGROUND OF THE INVENTION

Prior to the present invention a rigid cartridge containing a flexible recording disk has been loaded by a loading tray and registered in a disk drive by registration pins. The loading tray or cartridge holder has been used to receive the cartridge and move it to the loaded position on the pins. Examples of such loading apparatus are shown in U.S. Pat. Nos. 3,800,325; 3,845,502 and 4,272,795.

Possibly the clearest example of the prior art technique is shown in U.S. Pat. No. 3,845,502 issued to Robert L. Paus. In the Paus patent, the diskette cartridge contains registration holes that mate with registration pins on the disk drive frame. The cartridge is loaded by placing it in a cartridge holder or carriage. The carriage pivots between the load and unload positions. As the carriage pivots down onto the disk drive frame, it lowers the cartridge on to the registration pins. The registration holes in the cartridge, when they mate with the registration pins on the frame, position the cartridge relative to the disk drive spindle.

The difficulty with such prior art apparatus is that it is bulky and complex. Diskette drives are typically used as a part of another device such as a computer, a computer terminal or a typewriter. It is most important that the drive be compact, simple and low-cost. Use of a carriage to move the diskette cartridge into the drive works against making the drive a compact, simple and low-cost device.

SUMMARY OF THE INVENTION

This invention has accomplished the loading and registration of a diskette cartridge on registration pins in a diskette drive without the use of a carriage to move the cartridge between the load and unload positions. The cartridge is guided into the drive by a guide surface and springs; the springs press the cartridge against the surface. As the cartridge slides into the drive along the guide surface, the leading edge of the cartridge strikes the spindle. The spindle edge is beveled so that the cartridge tilts upward and rides over the spindle as the operator continues to shove the cartridge in the drive.

The upward tilted cartridge clears the recording head and moves further into the drive toward the registration pins. When the leading edge of the cartridge reaches the pins, the cartridge rides on top of the spindle and the pins. The spring pressure on the top of the cartridge keeps the cartridge riding against the top of the spindle and pins until the registration holes in the cartridge reach the registration pins. When the holes reach the pins, the spring pressure on the top of the cartridge snaps the cartridge over the pins so that it again rests against the guide surface. At this registered position, the access holes in the cartridge for the spindle and recording head are aligned with the spindle and head.

As an additional feature of the invention the tips of the registration pins are conical shaped and the registration holes are beveled. This assists the lowering of the cartridge as it is loaded and the lifting of the cartridge as it is unloaded. The lowering and lifting is necessary for the cartridge to clear the recording head, a fragile component, as the cartridge is loaded and unloaded.

In addition, the back wall of the diskette drive frame is positioned relative to the registration pins to prevent the registration holes in the cartridge from being pushed past the pins by the operator. If the leading edge of the cartridge strikes the back wall, the trailing edge of the registration holes has not passed the top of the conical pins so the cartridge will still snap into position when the operator stops pushing the cartridge into the drive.

As yet another feature of the invention, the handle on the disk clamping lever, that actuates the collet to clamp the flexible disk to the spindle, has a cam surface to finish the loading of a diskette cartridge that is substantially loaded but not registered. When the operator moves the lever, the cam surface of the handle finishes the loading by shoving the cartridge forward until it snaps down over the registration pins.

A significant advantage of this invention is that it feeds back to the tactile and auditory senses of the operator an indication that the cartridge has been properly loaded and registered in the drive. When the cartridge snaps over the pins, the operator feels and hears the snap action. In addition, the invention is compact, easy to manufacture and low in cost.

BRIEF DESCRIPTION OF DRAWINGS

The invention is described in detail below with reference to drawings, illustrating specific embodiments of the invention, in which.

DETAILED DESCRIPTION

Figure 1:
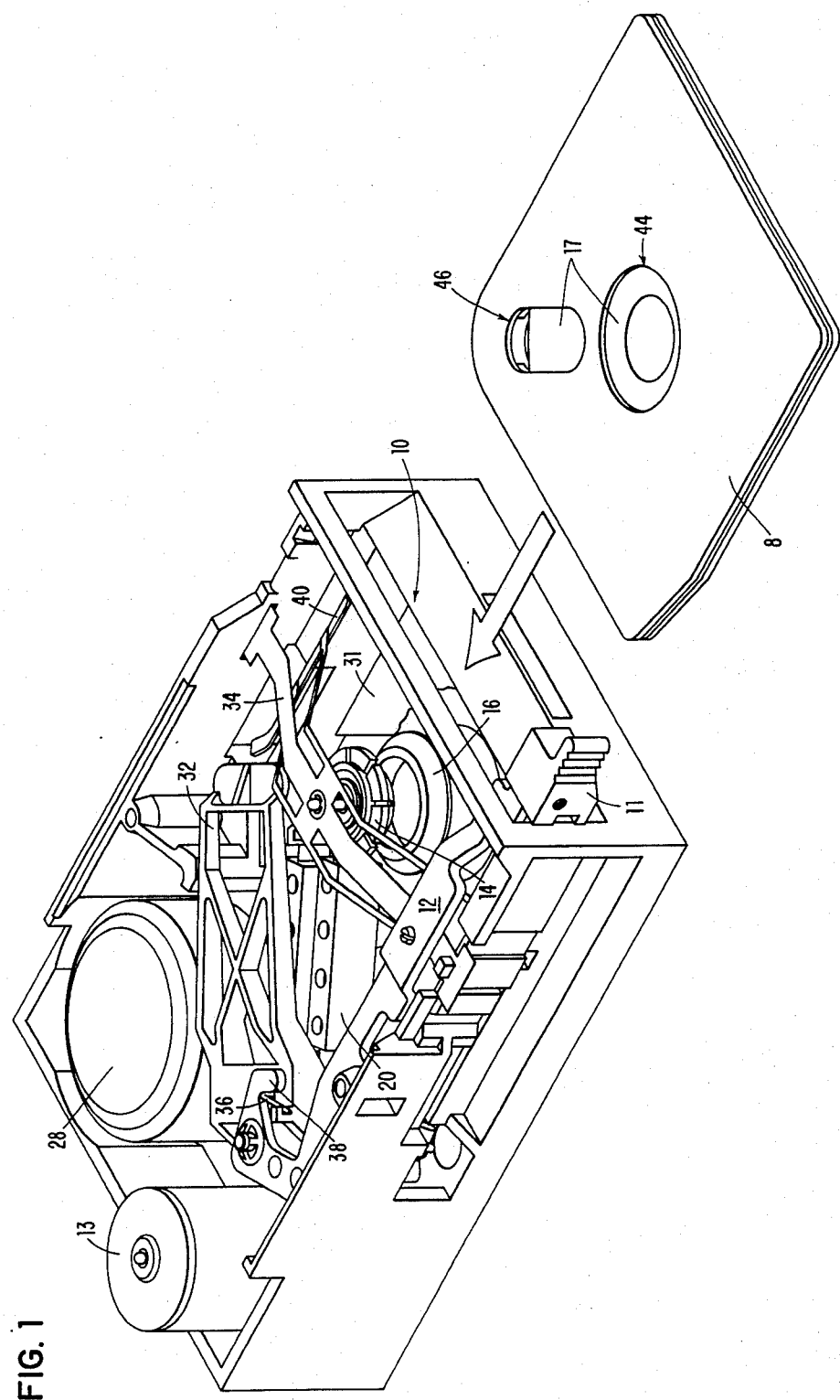
FIG. 1 is an isometric view of a diskette drive, in which the present invention is implemented, along with a rigid diskette cartridge in position for insertion into the drive.
Figure 2:
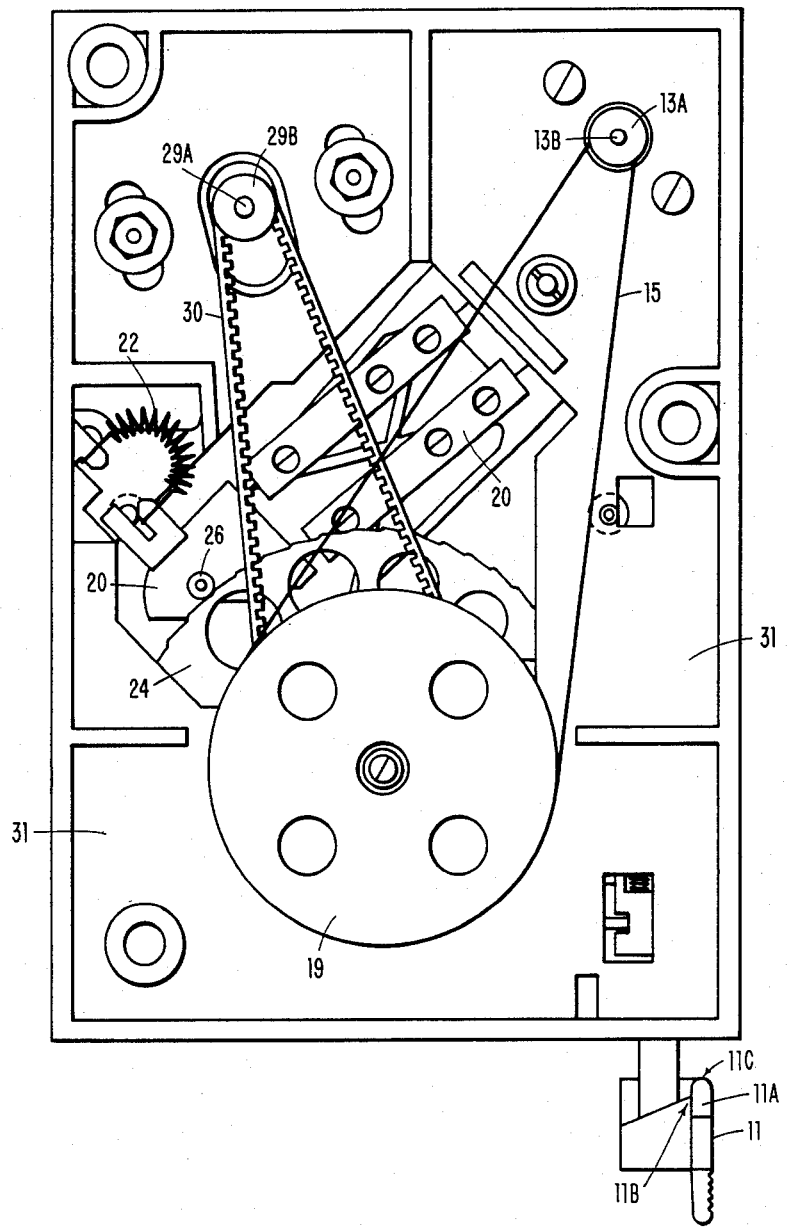
FIG. 2 is a bottom view of the diskette drive in FIG. 1 showing the drive belts that rotate the disk spindle and the head indexing cam.
Figure 3:
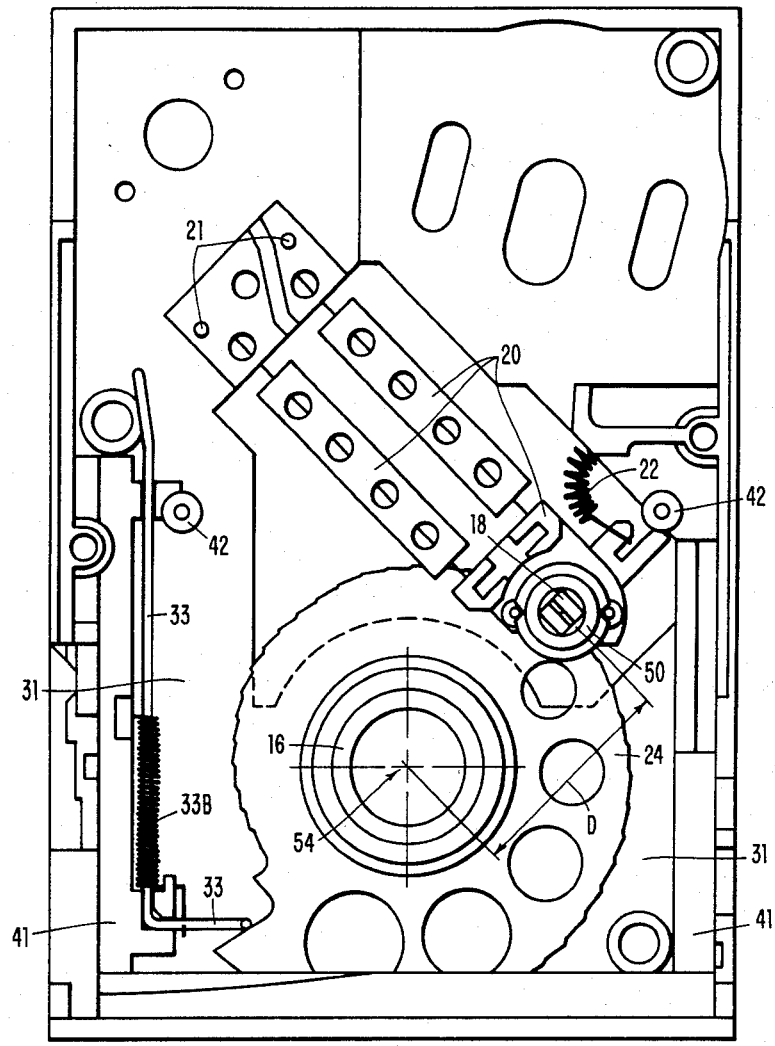
FIG. 3 is a top view of the diskette drive in FIG. 1 with some components removed so that the recording head, the head arm, the head indexing cam, the registration pins and the guide and registration shelves are visible.

The following description of the diskette drive in which the present invention is implemented is helpful in understanding the invention. However, this overview description may be skipped, if desired, by going directly to the description under the heading "Diskette Loading And Registration." FIGS. 1-3 are used in the following overview description. In all figures, common components have been given the same reference numerals.

In FIG. 1, diskette cartridge 8 is loaded through slot 10 at the front of the diskette drive assembly. When the diskette is in position in the assembly, handle 11 and lever 12 are moved from left to right, lowering collet 14. Collet 14 centers and clamps floppy disk 17 inside diskette 8 to spindle 16.

Spindle 16 is driven by DC motor 13 via belt 15, shown in FIG. 2, under frame 31 of the drive assembly. Drive pulley 13A for belt 15 is attached to the rotor shaft 13B of DC motor 13. Spindle pulley 19 for belt 15 is attached to spindle 16 to rotate the spindle.

Magnetic recording head 18, shown in FIG. 3, is mounted on flexure arm 20. It writes and reads the lower surface of the disk 17 (FIG. 1). The flexure arm 20 is fastened to the frame by pins 21. Flexure arm 20 guides head 18 along a radius of the disk by means of flexure in the arm rather than pivotal rotation. Flexure arm 20 is described in more detail in copending, commonly assigned application Ser. No. 340,170 filed Jan. 18, 1982 by M. J. Steen et al and entitled "Cantileverd Transducer Carriage."

Arm 20 carrying the head is pushed radially towards spindle 16 by spring 22 (FIG. 2). The head and flexure arm are pushed radially out from the spindle by head indexing cam 24.

The diskette drive uses stepped cam 24 to index read/write head 18 to one of 46 possible track positions on the disk. The bottom view of the diskette drive in FIG. 2 shows cam 24 and cam follower 26. Cam 24 is rotated by timing belt 30 driven by rotor shaft 29A and drive pulley 29B of stepper motor 28 (FIG. 1). Cam follower 26 attached underneath the head at the end of flexure arm 20 rides on the cam surface.

The cam follower 26 is a shaft and roller bearing assembly positioned directly under head 18. As cam 24 moves, cam follower 26 follows the cam surface. The cam surface has 46 dwells or steps corresponding to the 46 track positions on the disk. Cam 24 is rotated by stepping motor 28 to bring each cam dwell to the cam follower and thus index the head to each track.

DISKETTE LOADING AND REGISTRATION

Figure 4:
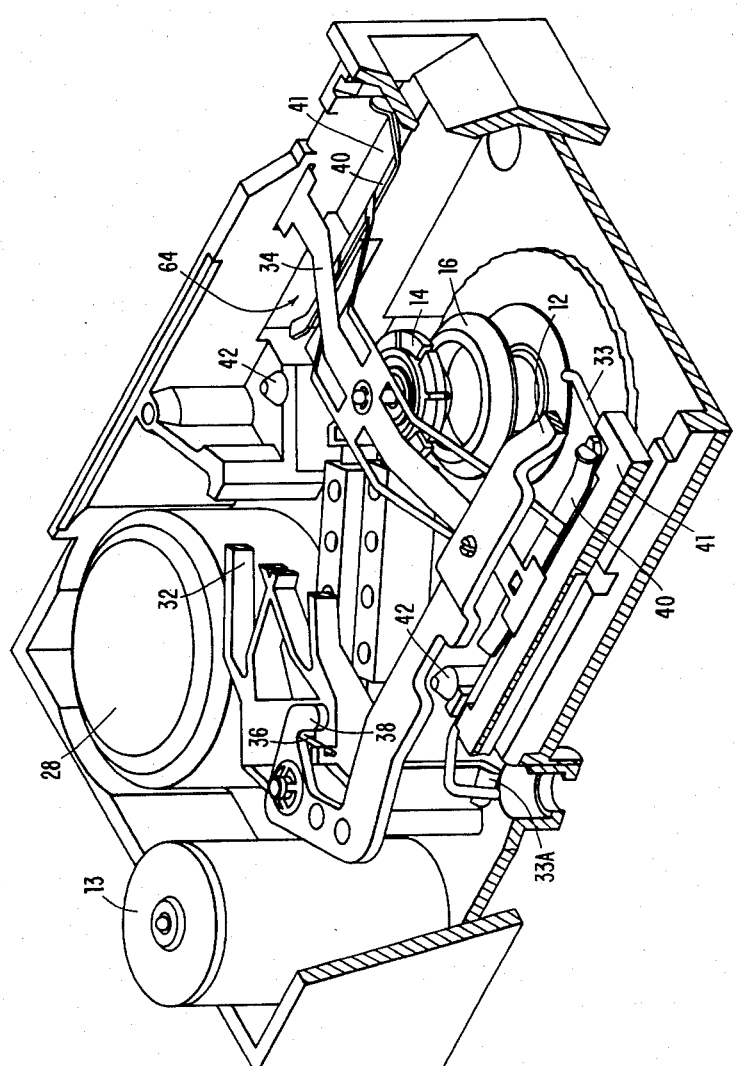
FIG. 4 is an isometric cutaway view of the diskette drive of FIG. 1 that illustrates the loading and registration mechanisms for the diskette cartridge.

The loading of diskette cartridge 8 into the diskette drive is now described with reference to FIGS. 1 and 4. Load lever 12 is moved left to the open position. This raises collet 16, head pressure-pad arm 32 and cleaning-pad pressure probe 33 out of the insertion path of the cartridge.

Pressure-pad arm 32 is normally spring-loaded down to hold disk 17 against head 18. When load lever 12 is in the open position, end 36 of the arm bias spring, which is underneath the arm, is pushed back by finger 38 on lever 12. Spring end 36 pushes on arm 32 to lift the arm about its pivot shaft. As lever 12 moves to the closed position after cartridge 8 is inserted, finger 38 moves away from spring end 36. This allows the arm bias spring underneath arm 32 to pull the arm down against the upper surface of disk 17.

Diskette cartridge 8 is inserted through the slot 10 in the front of the drive. As the cartridge moves into the drive, spring fingers 40 attached to leaf spring 34 provide a slight pressure on the top of the rigid cartridge. As the diskette cartridge moves into the drive, the front edge of the cartridge contacts the spindle 16 and rides up over the spindle. As the insertion continues, the front edge of the cartridge contacts conical registration pins 42 (42A and 42B).

When cartridge 8 is fully inserted, conical holes in the bottom of the cartridge will slip over the registration pins 42 in the drive. At the same time that the cartridge registration holes slip over the registration pins in the diskette drive, the spindle hole 44 in the diskette cartridge slips over the spindle 16. The slight pressure provided by the spring fingers 40 causes the cartridge to drop down in proper position over the conical pins and spindle. The operator can feel and hear the cartridge click into position.

The load operation is completed by moving the load lever 12 to the right to press leaf spring 34 down. This puts increased pressure on spring fingers 40 to register the diskette cartridge firmly on conical pins 42 and hold the bottom of the cartridge flat against guide and registration shelves 41. Collet 14 is also carried by leaf spring 34. When cartridge 8 is registered and the lever 12 is moved to the right, collet 14 moves down through the center of disk 17 and clamps disk 17 to spindle 16.

Also, with lever 12 moved to the right, pressure pad arm 32 is released and lowers a pressure pad on the end of the arm through slot 46 in cartridge 8 to hold the disk against the recording head. The head protrudes into the plane of the disk from the bottom of the disk drive through a slot that matches pressure pad slot 46 in the top of cartridge 8.

Moving lever 12 to the right also raises probe 33 to put pressure on a cleaning pad in the bottom of cartridge 8. Probe 33 (FIGS. 3 and 4) is normally spring biased up by spring 33B to put pressure on the cleaning pad for the lower surface of disk 17. However, when lever 12 is in the open or left-most position, cam 33A attached to lever 12 acts on the opposite end of probe 33 to rotate probe 33 down away from cartridge 8. Moving lever 12 to the right releases probe 33 to bring pressure on the cleaning pad.

The cartridge is withdrawn by reversing the above loading procedure. The lever arm 12 is moved to the left; this lifts collet 14, pressure pad arm 32 and probe 33 away from cartridge 8. The operator then pulls the diskette cartridge from the drive manually. As the diskette cartridge starts to come out of the drive, it rides up on the registration pins 42 and over spindle 16. Thus, the rigid shell of cartridge 8 lifts disk 17 clear of spindle 16 and head 18 (FIG. 3) as the cartridge rides up on pins 42 and spindle 16. The cartridge then is easily pulled out by the operator.

Figure 5A:
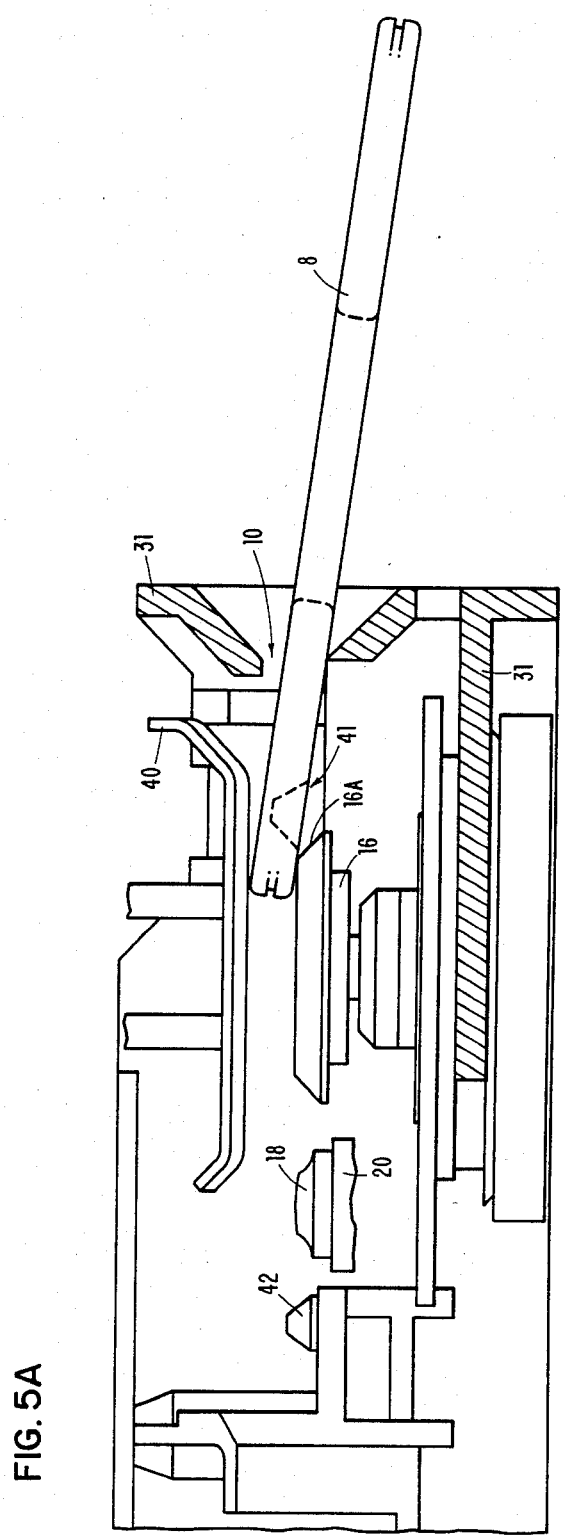
FIGS. 5A-5D is a sequence of cutaway side views showing the insertion of the rigid cartridge into the diskette drive.

The insertion sequence during the loading operation of a diskette cartridge into the diskette drive is illustrated in FIGS. 5A through 5D. In FIG. 5A, cartridge 8 has been inserted into the drive through opening 10 at the front of the drive. The frame 31 is shown cut away as well as most of the loading mechanisms illustrated in FIG. 4. One of the spring loaded fingers 40 is shown to indicate how the fingers push down on the top of the cartridge 8. In addition, head 18 is shown but the flexure head arm 20 is cut away. Also, only the right hand registration pin 42A (as viewed from the front of the drive) is shown.

In FIG. 5A, the leading edge of cartridge 8 has reached the beveled face 16A of spindle 16. As the operator pushes the cartridge forward, the leading edge of the cartridge rides up over spindle 16. Spring finger 40 keeps a downward pressure on cartridge 8 holding it magnetic disk as the disk rotates in the rotation plane, improved apparatus for loading said rigid cartridge in said drive, said improved apparatus comprising:

fixed guide means for guiding the cartridge as it is inserted into the drive and registering the cartridge on a guide surface in a registration plane parallel to the rotation plane;

said spindle and said head protruding into the insertion path of said cartridge and above said registration plane;

means for biasing the cartridge against the guide surface of said guide means and the top surface of said spindle as the cartridge is inserted;

said spindle having sides beveled to guide the leading edge of the cartridge up and over the spindle and head as the cartridge moves into the drive;

said biasing means pressing the cartridge against the top of the spindle and holding the cartridge away from said head as the cartridge passes over said spindle; and said cartridge biased onto the guide surface of said guide means by said biasing means when the spindle access opening aligns with said spindle whereby the cartridge is registered in the registration plane and said disk lies in the rotation plane.

2. The apparatus of claim 1 and in addition:

registration pins in the drive protruding into the insertion path and above said registration plane;

said cartridge having registration holes for mating with said registration pins when said cartridge is fully inserted in the drive; and said cartridge biased by said biasing means against the top of said registration pins after the spindle access opening of the cartridge reaches the spindle so that the cartridge does not contact the recording head as it is inserted.

3. The apparatus of claim 2 and in addition:

said cartridge, when said holes and pins align, snapping into a registered position, defined by said guide means and said pins, relative to the drive spindle with the spindle and head access openings of the cartridge aligned with the spindle and head of the drive.

4. The apparatus of claim 3 wherein:

one corner of the leading edge of said cartridge is truncated;

said guide means includes a blocking member for interfering with the insertion of said cartridge into the drive unless the the inserted cartridge is oriented so that the truncated corner of the cartridge provides clearance between said cartridge and said blocking member.

5. The apparatus of claim 3 wherein:

said recording head is positioned along the insertion path between said spindle and said registration pins;

said registration pins are beveled to contact the leading edge of said cartridge and lift the cartridge up over the top of the pins so that said cartridge is held above the recording head as the spindle access hole in the cartridge begins to align with the spindle and the cartridge is no longer held above the recording head by the spindle.

6. The apparatus of claim 5 wherein:

said registration pins are conical in shape and said holes are beveled registration cavities so that when said cavities slide over said pins at full insertion of the cartridge in the drive, the cartridge is guided to a position centered relative to the spindle.

7. The apparatus of claim 3 and in addition:

a load lever having an open and closed position and being moveable between the two positions;

actuating means for lifting a disk clamp collet away from the spindle when said lever is moved to the open position and for lowering the collet to clamp the disk to the spindle when the lever is moved to the closed position.

8. The apparatus of claim 7 and in addition:

second actuating means for lifting a recording head pressure pad away from the disk when said lever is moved to the open position and for lowering the pressure pad against the disk and opposite the head when the lever is moved to the closed position.

9. The apparatus of claim 8 and in addition:

third actuating means for lifting a pressure probe away from the cartridge when said lever is moved to the open position and for moving the pressure probe against a disk cleaning pad when the lever is moved to the closed position.

10. Method for loading a rigid diskette cartridge in a disk drive having a recording head, a spindle for rotating the floppy disk in a rotation plane within the cartridge, registration and guide surface for guiding the cartridge into the drive and for registering the cartridge in a plane parallel to the rotation plane, said spindle and recording head extending above said registration plane, registration pins for registering with registration holes in the cartridge so that when the cartridge is fully loaded into the drive the spindle and head access openings in the cartridge are aligned with the spindle and recording head, said method comprising the steps of:

inserting the cartridge into the disk drive along the guide surface;

biasing the cartridge against the guide surface, as it is inserted;

guiding the cartridge up off the guide surface and onto the top of the spindle when the leading edge of the cartridge contacts the spindle;

biasing the cartridge against the top of the spindle after the cartridge reaches the spindle during insertion;

guiding the cartridge up to the top of the registration pins when the cartridge leading edge reaches the registration pins;

biasing the cartridge against the top of the registration pins after the cartridge reaches the pins during insertion; and pressing the cartridge down onto the registration surface when the registration holes in the cartridge align with the registration pins whereby the cartridge is registered relative to the spindle and the recording head.

11. The method of claim 10 wherein said registration pins are conical shaped and the registration holes are beveled cavities so that as the cartridge snaps down on the registration surface and is pulled into the registered position by the registration pins.

12. The method of claim 10 and in addition:

clamping the disk on the spindle after the cartridge is registered in the drive.

13. The method of claim 12 and in addition:

pressing the disk onto the recording head after the cartridge is registered in the drive.

14. The method of claim 13 and in addition:

pressing a cleaning pad against the disk after the cartridge is registered in the drive.

* * * * * against the top of spindle 16 and the lower edge of opening 10 in frame 31.

Figure 5B:
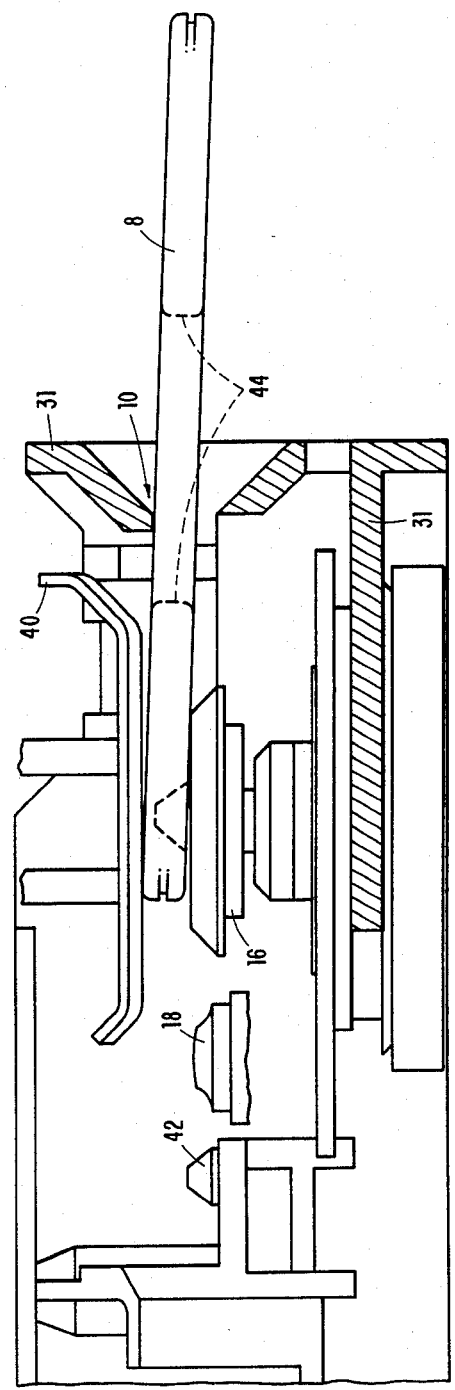

As the cartridge is pushed further into the drive, as shown in FIG. 5B, the downward pressure of spring finger 40 pivots cartridge 8 so that it rides on the top of spindle 16 and against the top of opening 10 in frame 31. Cartridge 8 continues to ride across the top of the spindle 16 until the spindle opening 44 in the cartridge begins to clear the top of spindle 16.

Figure 5C:
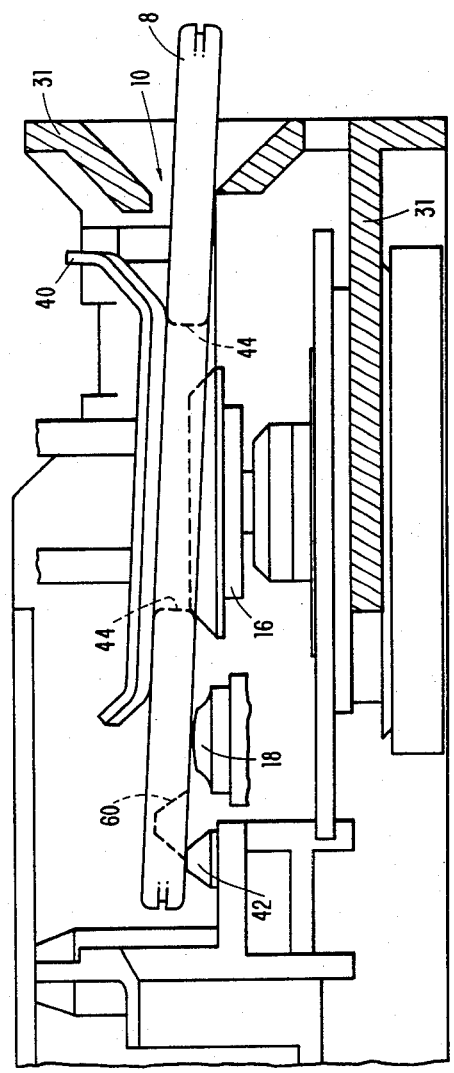

As shown in FIG. 5C, when spindle opening 44 begins to clear the spindle, the bottom of the trailing portion of the cartridge rides on the lower edge of opening 10. Before cartridge 8 slips down over spindle 16, the leading edge of cartridge 8 strikes registration pins 42 and rides up over the pins. Thus, spring fingers 40 are now pushing cartridge 8 down, and the cartridge is resting on the top of pins 42 and the lower edge of opening 10. Pins 42, thus act in the capacity of continuing to lift cartridge 8 over head 18 until the read/write access slot 46 of cartridge 8 is over the head.

Figure 6:
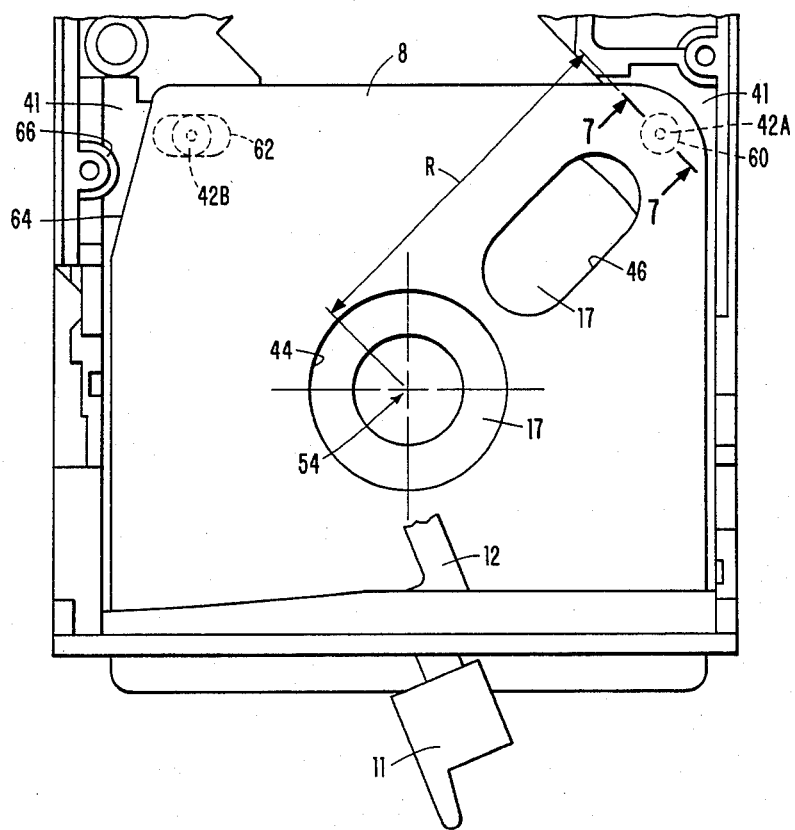
FIG. 6 is a top view of a portion of the diskette drive showing the cartridge in the registered position.

Cartridge 8 is now almost loaded. The loading operation is completed when the operator continues to push cartridge 8 forward so that conical hole 60 will slip down over registration pin 42A, and beveled slot 62 will slip down over pin 42B (FIG. 6).

Figure 5D:
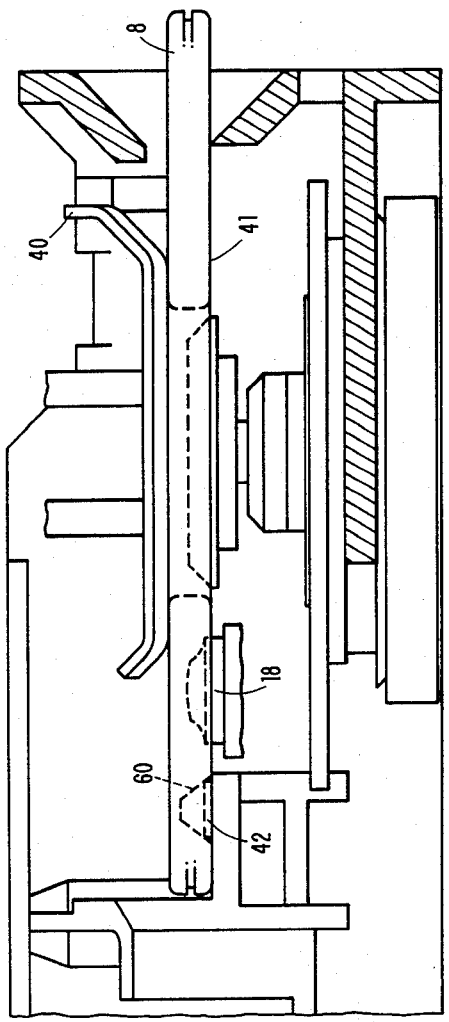

A side view of the registered position of cartridge 8 in the drive is shown in FIG. 5D. As the conical hole 60 in the cartridge 8 registers with pin 42A, the cartridge snaps down into a registered position over pins 42 and against guide and registration shelf 41. The spring finger 40 continues to provide the downward bias pressure to snap the cartridge 8 over the registration pins 42. This snap action gives the operator positive tactile and auditory feedback that cartridge 8 has indeed registered in the drive.

When cavity 60 has reached pin 42A, and the cartridge 8 snaps down into the registered position, the read/write access slot 46 (FIG. 1) will be in a position such that head 18 can penetrate into the plane of the disk within the cartridge. With the cartridge properly registered on pins 42, handle 11 may be moved to the right by the operator actuating the clamping of the disk on the spindle, the lowering of the pressure pad and the raising of the cleaning pad as previously described with reference to FIGS. 1 and 4.

Handle 11 has cam surfaces that guarantee fail-safe loading. The cam surfaces of handle 11 are most easily seen in FIG. 2. Projection 11A of handle 11 extends far enough down so that if cartridge 8 is not fully inserted into the drive, surface 11B will hit the side wall of the cartridge and block handle 11 from actuating the collet clamping mechanism. This prevents the collet from damaging the center hole of disk 17 in diskette cartridge 8. If the cartridge is almost fully inserted into the drive, but not properly registered, then rounded surface 11C of handle 11 will push cartridge 8 into the diskette drive so that it registers on pins 42 as lever 12 moves to the left in FIG. 2. Thus, surfaces 11B and 11C of handle 11 insure either that the disk 17 cannot be clamped if the cartridge is not properly loaded or that the cartridge will be properly loaded before the disk is clamped.

Referring now to FIG. 6, the registration geometry of the diskette cartridge 8 and the drive is shown. When the cartridge is fully inserted and aligned by registration pins 42, registration hole 60 and registration slot 62 in the bottom of cartridge 8 fit over registration pins 42A and 42B respectively. Cartridge 8 is positioned relative to axis of rotation 54 for disk 17. Pin 42A and registration hole 60 are precisely positioned so that there is a predetermined distance R from axis 54 to the center of pin 42A and hole 60.

Pin 42B registers in slot 62 of the cartridge to define the angular orientation of the cartridge about axis 54 in the drive. By using a slot 62 rather than a hole, it is not critical to maintain a predetermined distance between pin 42B and pin 42A. It is only necessary that pin 42B and slot 62 be positioned so that cartridge 8 have the proper angular orientation relative to axis 54.

With cartridge 8 snapped down onto its guide and registration surfaces 41 over the registration pins 42A and 42B, the spindle access opening 44 and the recording access opening 46 will be properly aligned with the spindle and recording head.

Figure 7:
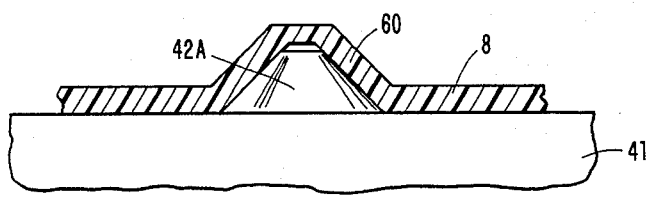
FIG. 7 shows how the registration cavities in the bottom of the cartridge mate with the registration pins in the diskette drive.

As described earlier, registration hole 60 and registration slot 62 are beveled to mate with the conical surface of pins 42A and 42B. This is most clearly shown in FIG. 7 for pin 42A and registration cavity 60. As registration cavity 60 slips over pin 42A, the cartridge is pulled into a registered position relative to axis 54 by the matching conical shape of pin 42A and conical cavity 60 and by the conical shape of pin 42B and beveled walls of slot 62. When the cartridge snaps down over the registration pins, the bottom of the cartridge 8 rests on the registration surface 41 as illustrated in FIG. 7.

In FIG. 6, handle 11 and a portion of lever 12 are shown with the lever in the closed position. In this position, handle 11 prevents an operator from pulling the cartridge out of the disk drive. The cartridge can be unloaded only if the operator moves handle 11 to the open position shown in FIG. 1.

In addition, FIG. 6 illustrates the relation between the truncated corner 64 of cartridge 8 and blocking member 66 that protrudes from the side wall adjacent the lefthand guide surface 41 (FIG. 6) into the path of cartridge 8. Unless cartridge 8 is properly oriented, blocking member 66 interferes with the insertion of the cartridge into the disk drive.

Figure 8:
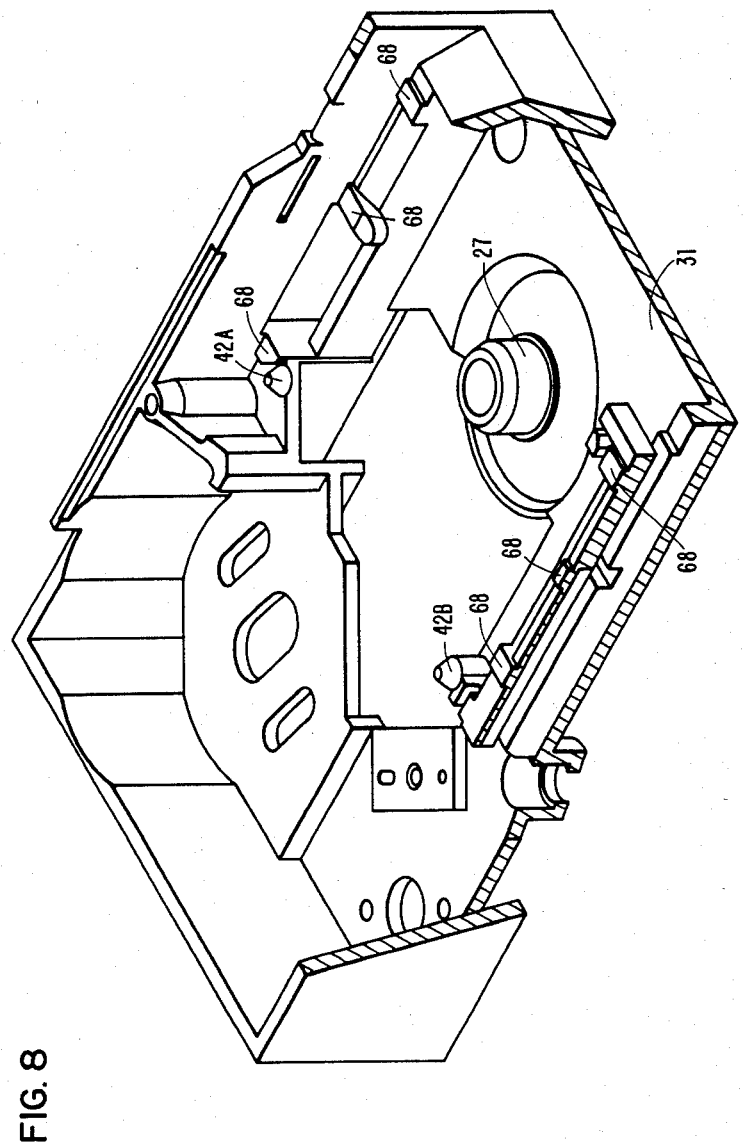
FIG. 8 is a view of the diskette drive frame showing the registration pins and the registration pads for the diskette cartridge.

In FIG. 8, an alternative embodiment of frame 31 is shown using guide pads rather than guide shelves. The guide and registration pads 68, hub 27 (on which spindle 16 and head indexing cam 24 are mounted) and registration pins 42A and 42B are preferably molded with frame 31 as a single piece of plastic. To simplify the molding tolerances, the guide shelves 41 of FIG. 3 have been replaced by guide and registration pads 68. The pads define the registration plane of the diskette cartridge relative to the spindle and head. By replacing the guide shelves with guides pads, only the position of the surface of each pad is critical. Thus, the surface positions of pads 68 (FIG. 8) and not the surfaces of shelves 41 (FIG. 3) need to be critically controlled during the molding of frame 31.

While we have illustrated and described the preferred embodiment of our invention, it is understood that we do not limit ourselves to the precise constructions herein disclosed, and the right is reserved to all changes and modifications coming within the scope of the invention as defined in the appended claims.

What is claimed is:

1. In a disk drive for reading and writing magnetic signals on a flexible magnetic disk housed inside a rigid cartridge having access openings for a spindle and a read/write head, said drive having a rotatable drive spindle for rotating the magnetic disk in a rotation plane inside the rigid cartridge, and said drive also having a read/write head for reading and writing signals on said